United States Patent Office 3,829,492
Patented Aug. 13, 1974

3,829,492
FUNGICIDAL SALICYLALDEHYDE HYDRAZONES AND AZINES
George A. Miller, Glenside, and Stanley A. Greenfield, Ambler, Pa., assignors to Rohm and Haas Company, Philadelphia, Pa.
No Drawing. Filed Feb. 4, 1972, Ser. No. 223,707
Int. Cl. C07c 109/16
U.S. Cl. 260—566 B                              2 Claims

ABSTRACT OF THE DISCLOSURE

Fungicidal compositions containing as the active ingredient salicylaldehyde hydrazones and novel azines derivable from them by reaction with an aldehyde or ketone. They are particularly effective in controlling cercospora blights.

---

This invention is concerned with fungicidal compounds of the general formula:

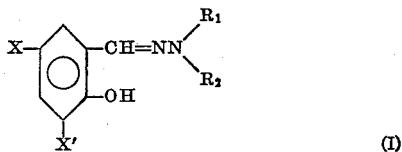

(I)

wherein X is one of halo, preferably bromo and chloro, methoxy and nitro, then X' is one of hydrogen, nitro and halo, preferably bromo and chloro, and alternatively, wherein X is hydrogen, then X' is one of methoxy and nitro; $R_1$ and $R_2$ are individually selected from the group consisting of:

(a) hydrogen,
(b) alkyl of 1 to 4 carbon atoms
(c) alkyl of 1 to 4 carbon atoms substituted with cyano, chloro, hydroxy or nitro,
(d) phenyl, and
(e) phenyl substituted with chloro, methyl or nitro;

$R_2$ may be the group (a) —C(O)$R_3$ wherein $R_3$ is
 (1) hydrogen,
 (2) alkyl of 1 to 11 carbon atoms,
 (3) alkyl of 1 to 11 carbon atoms substituted with chloro, cyano or hydroxy
 (4) alkoxy or thioalkoxy of 1 to 4 carbon atoms,
 (5) phenyl, or
 (6) phenyl substituted with chloro, hydroxy, methoxy, methyl or nitro groups,
(b) —SO$_2$R$_4$ wherein $R_4$ is
 (1) alkyl of 1 to 10 carbon atoms,
 (2) phenyl or
 (3) phenyl substituted with chloro, methyl or nitro groups, or
(c) —P(X)(OR$_5$)$_2$ wherein X is O or S and $R_5$ is alkyl of 1 to 4 carbon atoms, and $R_1$ and $R_2$ taken together may be (a) the divalent radical =CR$_6$R$_7$ wherein $R_6$ and $R_7$ are individually selected from
 (1) hydrogen,
 (2) alkyl of 1 to 4 carbon atoms,
 (3) hydroxy-alkyl of 1 to 4 carbon atoms,
 (4) alkene of 2 to 4 carbon atoms,
 (5) $C_1$ to $C_4$ alkoxy-alkene,
 (6) phenyl, or
 (7) phenyl substituted with benzyloxy, methoxy or nitro, or $R_6$ and $R_7$ together may be alkylene of 2 to 6 carbon atoms,
(b) alkylene of 2 to 6 carbon atoms or (c) with the nitrogen to which they are attached, morpholinyl.

Typical compounds included in this general formula are:
5-bromosalicylaldehyde hydrazone
5-chlorosalicylaldehyde methylhydrazone
5-fluorosalicylaldehyde dimethylhydrazone
5-iodosalicylaldehyde methyl(propyl)hydrazone
5-hydroxysalicylaldehyde formylhydrazone
3-methoxysalicylaldehyde formyl(methyl)hydrazone
5-methoxysalicylaldehyde acetylhydrazone
3-nitrosalicylaldehyde ethyl(propyl)hydrazone
3,5-dibromosalicylaldehyde butyl(methyl)hydrazone
3,5-dichlorosalicylaldehyde methyl(isopropyl)hydrazone
3,5-difluorosalicylaldehyde butyrylhydrazone
3,5-diiodosalicylaldehyde methyl(propionyl)hydrazone
3,5-dibromosalicylaldehyde isopropylidenehydrazone
3,5-dichlorosalicylaldehyde-1-methylpropylidene-
 hydrazone
5-bromo-3-chlorosalicylaldehyde 1-ethylpropylidene-
 hydrazone
3-bromo-5-chlorosalicylaldehyde-(1-hydroxyethyl)
 propylidenehydrazone
5-chloro-3-fluorosalicylaldehyde(1-methylpentylidene-
 hydrazone)
5-bromo-3-iodosalicylaldehyde (α-methylbenzylidene-
 hydrazone)
3-bromo-5-nitrosalicylaldehyde (α-methyl-4-methoxy-
 benzylidenehydrazone)
3-chloro-5-nitrosalicylaldehyde (α-ethyl)-3,4-dinitro-
 benzylidenehydrazone
3-iodo-5-nitrosalicylaldehyde (α-hydroxyethyl)
 benzylidenehydrazone
3,5-dibromosalicylaldehyde cyclohexylidenehydrazone These compounds are excellent fungicides for the control of plant diseases. They are particularly effective for the control of cercospora blights and leaf spots. The Cercospora-caused diseases appear to be universal and are prevalent on such diverse crops as the avocado, beet, carrots, celery, coffee, cotto, grasses for forage and grazing such as tall fesque and sorghums, annual legumes used for soil improvement such as bur-clovers and crotolaria and velvet-beans, perennial legumes used for forage such as alfalfa and clover, peanuts, peppers, rice, soybeans, sugar beets and sugarcane.

Chemically these compounds may be considered as derivatives of hydrazine belonging to the general class of (1) hydrazones if only a derivative of a salicylaldehyde is involved or of (2) azines of the hydrazone is further reacted with an aldehyde or ketone. The azines prepared in this investigation are novel.

The compounds of Formula I may be prepared by the reaction of a salicylaldehyde with hydrazine or a substituted hydrazine. The following equation depicts this wherein the various symbols have the meanings given above.

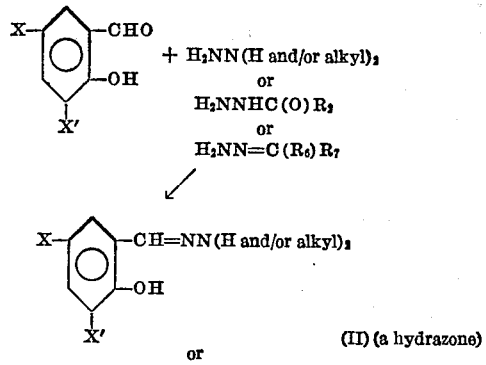

(II) (a hydrazone)
or

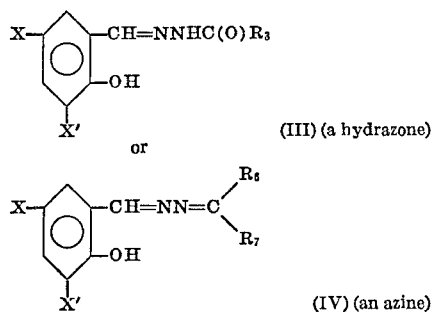

(III) (a hydrazone)

or (IV) (an azine)

The salicylaldehyde intermediates are for the most part products of commerce or else are readily made by standard chemical reactions.

The reactions of the salicylaldehyde with hydrazine produce the salicylaldehyde hydrazones of Formula I is a well-known general reaction and is usually carried out in the presence of an inert solvent under mild basic conditions. Inert solvents include water, alcohols, ethyl acetate, dioxane, dimethylformamide and dimethyl sulfoxide. Alcohols and aqueous alcohols are preferred solvents. Basic conditions may be suplied by such typical basic compounds as potassium or sodium acetate, sodium carbonate, tertiary amines such as triethylamine or pyridine, and excess hydrazine.

The following illustrates a typical procedure for preparing 3,5-dibromosalicylaldehyde hydrazone as an example. To a solution of 86.6 g. (2.62 moles) of hydrazine in 500 ml. of methanol was added over a period of 2 hours, at room temperature a solution of 439 g. (157 mole) of 3.5-dibromosalicylaldehyde in 3 l. of methanol. A slurry resulted and was filtered. The solid residue was washed with methanol and dried to give 294 g. melting at 169–171° C. The filtrate was concentrated to give another 129 g. of solid melting at 165–167° C. The combined solids represent a 90% yield of 3,5-dibromosalicylaldehyde hydrazone. These values agree with the same preparation reported by Wolf and Westphal in Annalen 657, 39 (1962).

The azines may also be prepared by reaction of a ketone of the formula $R_6(R_7)C=O$ with a hydrazone of the formula

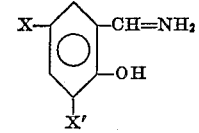

in accordance with the following equation wherein the various symbols have the meaning given above

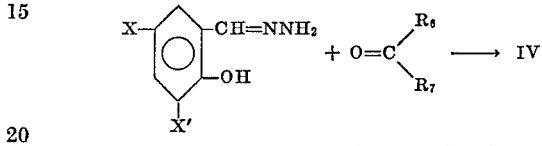

The usual method for carrying out the above reaction is to dissolve the hydrazone in an excess of the ketone and to heat at reflux temperature for up to 16 hour, then to partially remove the solvent and allow the azine to crystallize out with cooling.

The following illustrates the preparation of 3,5-dibromosalicylaldehyde isopropylidenehydrazone as an example. A solution of 20 g., 0.068 mole, of 3,5-dibromosalicylaldehyde hydrazone in 300 ml. of acetone was refluxed for 2 hours then was partially stripped of the excess acetone. The remaining solution was cooled overnight to give 15 g., of an orange solid melting at 146–148° C. Analyses confirmed that this was an 66% yield of 3,5-dibromosalicylaldehyde isopropylidenehydrazone.

The following Table I lists typical salicylaldehyde hydrazones which were made in this investigation and their melting points and Table II gives the analytical data obtained on them. Table III lists typical azines which were made and their melting points and Table IV describes the analytical data obtained.

TABLE I.—SALICYLALDEHYDE HYDRAZONES

| Example | X | X' | $R_1$ | $R_2$ | Melting point (° C.) |
|---|---|---|---|---|---|
| 1 | Br | H | H | H | 68–70 |
| 2 | Cl | H | H | H | 83–85 |
| 3 | $CH_3O$ | H | H | H | 111–113 |
| 4 | H | $NO_2$ | H | H | 181–183 |
| 5 | $NO_2$ | H | H | H | 186–187 |
| 6 | Br | Br | H | H | 168–169 |
| 7 | Cl | Cl | H | H | 150–151 |
| 8 | $NO_2$ | Br | H | H | 205–206 |
| 9 | Br | $NO_2$ | H | H | 217–219 |
| 10 | Br | Br | H | $CH_3$ | 143–145 |
| 11 | Br | Br | H | $-CH_2CH_2OH$ | 88–90 |
| 12 | Br | Br | H | $-CH_2CH_2CN$ | 159–161 |
| 13 | Br | Br | $CH_3$ | $CH_3$ | 95–97 |
| 14 | Br | Br | | $-(CH_2)_2O(CH_2)_2-$ | 194–196 |
| 15 | Br | Br | | $-(CH_2)_5-$ | 83–85 |
| 16 | Br | Br | | $-(CH_2)_6-$ | 75–76 |
| 17 | Br | Br | H | $C_6H_5$ | 146–148 |
| 18 | Br | Br | H | $-C_6H_3(NO_2)_2-2,4$ | >250 |
| 19 | Br | Br | H | $-C(O)H$ | 251–253 |
| 20 | Br | Br | H | $-C(O)CH_3$ | 260–262 |
| 21 | Br | Br | H | $-C(O)CH_2CN$ | 233–234 |
| 22 | Br | Br | H | $-C(O)CH_2CH(OH)CH_3$ | 191–192 |
| 23 | Br | Br | H | $-C(O)(CH_2)_8CH_3$ | 171–172 |
| 24 | Br | Br | H | $-C(O)OC_2H_5$ | 182–184 |
| 25 | Br | Br | H | $-C(O)C_6H_4OH-2$ | >250 |
| 26 | Br | Br | H | $-C(O)C_6H_3Cl_2-3,4$ | 239–240 |
| 27 | Br | Br | H | $-C(O)C_6H_3Cl_2-2,4$ | 203–206 |
| 28 | Br | Br | H | $-SO_2CH_3$ | 196–198 |
| 29 | Br | Br | H | $-SO_2C_6H_5$ | 187–188 |
| 30 | Br | Br | H | $-SO_2C_6H_4CH_3-4$ | 179–180 |
| 31 | Br | Br | H | $-SO_2C_6H_2Cl_3-2,4,5$ | 204–205 |
| 32 | Br | Br | H | $-PO(OC_2H_5)_2$ | 160–161 |
| 33 | Br | Br | H | $-PS(OC_2H_5)_2$ | 79–81 |
| 34 | Br | Br | $CH_3$ | $-C(O)H$ | 174–175 |
| 35 | Br | Br | $-CH_2CH_2OH$ | $-C(O)H$ | 134–136 |

NOTE.—$R_1$ and $R_2$=H, alkyl or aryl.

TABLE II.—IDENTITY OF SALICYLALDEHYDE HYDRAZONES

| | | Literature reference or analysis* | | | | |
|---|---|---|---|---|---|---|
| | | Percent | | | | |
| Example | Empirical formula | C | H | Halogen | N | O |
| 1 | | Chem. Abstracts 60, 10591a (1964) | | | | |
| 2 | $C_7H_7ClN_2O$ | 49.9 (49.2) | 4.1 (4.1) | Cl, 21.0 (20.8) | 14.5 (16.4) | 10.6 (9.4) |
| 3 | $C_8H_{10}N_2O_2$ | 57.6 (57.9) | 6.2 (6.1) | | 16.8 (16.8) | 19.6 (91.2) |
| 4 | $C_7H_7N_3O_3$ | 46.8 (4.64) | 3.9 (3.9) | | 23.2 (23.2) | 26.4 (26.5) |
| 5 | | Chem. Abstracts 63, 938f (1965) | | | | |
| 6 | | Ann. 657, 47 (1962) | | | | |
| 7 | $C_7H_6Cl_2N_2O$ | 41.4 (41.0) | 3.0 (2.9) | Cl, 34.8 (34.7) | 13.6 (13.6) | 7.8 (7.8) |
| 8 | $C_7H_6BrN_3O_3$ | 32.5 (32.2) | 2.5 (2.3) | Br, 31.2 (30.8) | 16.2 (16.1) | 18.5 (18.5) |
| 9 | $C_7H_6BrN_3O_3$ | 32.9 | 2.4 | Br, 30.3 | 16.2 | 18.9 |
| 10 | $C_8H_8Br_2N_2O$ | 31.8 (31.2) | 2.6 (2.6) | Br, 51.4 (51.9) | 9.1 (9.1) | 5.6 (5.2) |
| 11 | | Chem. Abstracts 69, 106117h (1968) | | | | |
| 12 | $C_{10}H_8Br_2N_3O$ | 35.3 (34.6) | 2.5 (2.6) | Br, 45.7 (46.1) | 12.1 (12.1) | 5.3 (4.6) |
| 13 | $C_9H_{10}Br_2N_2O$ | 34.1 (33.6) | 3.2 (3.1) | Br, 49.4 (49.6) | 8.8 (8.7) | 6.0 (5.0) |
| 14 | $C_{11}H_{12}Br_2N_2O_2$ | 36.0 (36.2) | 3.6 (3.3) | Br, 43.9 (43.0) | 7.6 (7.8) | 9.0 (8.8) |
| 15 | $C_{12}H_{14}Br_2N_2O$ | 39.9 (39.8) | 3.8 (3.9) | Br, 44.2 (44.1) | 7.8 (7.7) | 4.6 (4.4) |
| 16 | $C_{13}H_{16}Br_2N_2O_3$ | 41.8 (41.5) | 4.2 (4.3) | Br, 41.4 (42.6) | 7.4 (7.4) | 4.2 (4.3) |
| 17 | | Chem. Abstracts 67, 41234f (1967) | | | | |
| 18 | $C_{13}H_8Br_2N_4O_5$ | 33.8 (33.8) | 1.8 (1.8) | Br, 34.9 (34.8) | 12.0 (12.2) | 17.6 (17.4) |
| 19 | $C_8H_6Br_2N_2O_2$ | 30.0 (39.8) | 1.6 (1.9) | Br, 49.7 (49.6) | 8.4 (8.7) | 10.1 (9.9) |
| 20 | $C_9H_8Br_2N_2O_2$ | 32.1 (32.2) | 2.4 (2.4) | Br, 44.6 (47.5) | 8.1 (8.3) | 9.6 (9.5) |
| 21 | $C_{10}H_7Br_2N_3O_2$ | 33.4 (33.3) | 2.2 (1.6) | Br, 43.6 (44.4) | 11.8 (11.6) | 8.7 (8.8) |
| 22 | $C_{11}H_{12}Br_2N_2O_3$ | 35.0 (34.8) | 3.2 (3.2) | Br, 41.7 (42.1) | 7.4 (7.4) | 12.7 (12.6) |
| 23 | $C_7H_{24}Br_2N_2O_2$ | 45.5 (45.5) | 5.1 (5.4) | Br, 35.9 (35.8) | 6.2 (6.3) | 7.2 (7.1) |
| 24 | $C_{10}H_{10}Br_2N_2O_3$ | 33.4 (32.8) | 2.8 (2.7) | Br, 44.2 (43.6) | 7.7 (7.7) | 13.0 (13.1) |
| 25 | $C_{14}H_{10}Br_2N_2O_3$ | 40.2 (40.6) | 2.4 (2.4) | Br, 38.7 (38.7) | 6.7 (6.8) | 12.6 (11.6) |
| 26 | $C_{14}H_8Br_2Cl_2N_2O_2$ | 35.9 (36.2) | 1.9 (1.5) | Br, 34.3 (34.2); Cl, 15.1 (15.3) | 5.8 (6.0) | 6.8 (6.9) |
| 27 | $C_{14}H_8Br_2Cl_2N_2O_2$ | 36.2 | 1.7 | Br, 34.4; Cl, 14.8 | 6.0 | 6.9 |
| 28 | $C_8H_8Br_2N_2O_3S$ | 26.1 (25.8) | 2.0 (2.1) | Br, 42.7 (43.0) | 7.5 (7.5) | 12.8 (12.9) |
| 29 | $C_{13}H_{10}Br_2N_2O_3S$ | 36.1 (36.0) | 2.7 (2.3) | Br, 36.1 (36.7) | 6.3 (6.5) | 10.4 (11.0) |
| 30 | $C_{14}H_{12}Br_2N_2O_3S$ | 37.4 (37.6) | 2.3 (2.7) | Br, 35.5 (35.5) | 6.3 (6.2) | 10.7 (10.7) |
| 31 | $C_{13}H_7Br_2Cl_3N_2O_3S$ | 28.7 (29.1) | 1.3 (1.3) | Br, 29.5 (29.8); Cl, 19.7 (19.7) | 5.2 (5.2) | 8.9 (8.9) |
| 32 | $C_{11}H_{15}Br_2N_2O_4P$ | 30.6 (30.7) | 3.4 (3.3) | Br, 37.5 (37.2) | 6.5 (6.5) | P, 7.6 (7.2) |
| 33 | $C_{11}H_{15}Br_2N_2O_3PS$ | 29.7 (26.6) | 3.6 (3.4) | Br, 35.8 (35.9) | 6.2 (6.3) | P, 6.9 (6.9) |
| 34 | $C_9H_8Br_2N_2O_2$ | 32.4 | 2.3 | Br, 47.1 | 8.3 | 7.0 |
| 35 | $C_{10}H_{10}Br_2N_2O_3$ | 33.2 | 2.7 | Br, 43.7 | 7.6 | 13.0 |

*Values are given as found (calculated).

TABLE III.—SALICYLALDEHYDE AZINES

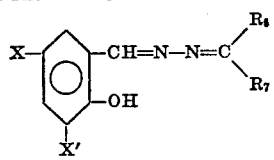

| Example | X | X' | $R_6$ | $R_7$ | Melting point (° C.) |
|---|---|---|---|---|---|
| 36 | H | H | $CH_3$ | $CH_3$ | 67–69 |
| 37 | Br | H | $CH_3$ | $CH_3$ | 138–140 |
| 38 | H | $CH_3O$ | $CH_3$ | $CH_3$ | 75–76 |
| 39 | H | $NO_2$ | $CH_3$ | $CH_3$ | 123–125 |
| 40 | $NO_2$ | H | $CH_3$ | $CH_3$ | 154–156 |
| 41 | Br | Br | H | $-CH_2CH_2CH_3$ | 85–87 |
| 42 | Br | Br | H | $-C_6H_4OCH_2C_6H_5-4$ | 200–203 |
| 43 | Br | Br | $CH_3$ | $CH_3$ | 146–148 |
| 44 | Cl | Cl | $CH_3$ | $CH_3$ | 116–118 |
| 45 | $NO_2$ | Br | $CH_3$ | $CH_3$ | 218–220 |
| 46 | Br | $NO_2$ | $CH_3$ | $CH_3$ | 214–216 |
| 47 | Br | Br | $CH_3$ | $-CH=CHOCH_3$ | 160–162 |
| 48 | Br | Br | $CH_3$ | $-CHOHCH_3$ | 120–122 |
| 49 | Br | Br | $-CH_2CH_2CH_2CH_2CH_2-$ | | 82–3t |

The compounds of this invention have utility as agricultural fungicides. Hydrazones of this type have been evaluated on human pathogenic bacteria and fungi, e.g., in Chem. Abstracts 67, 41234f (1967) such tests are reported for 3,5-dibromosalicylaldehyde phenylhydrazone and in Chem. Abstracts 69, 106117h (1969) for 3,5-dibromo-(and 3,5-dichloro)salicylaldehyde 2-hydroxyethylhydrazone. Very little is known regarding hydrazones as agricultural biocides. 2 - Chloroacetaldehyde 2,4-dinitrophenylhydrazone is reported to be a protectant foliar fungicide, 4 - o-chlorophenylhydrazono-3-methyl-5-isoxazol-5-one is stated to control botrytis on strawberries, and acrolein phenylhydrazone is said to be a systemic insecticide.

In evaluating these compounds, a preliminary fungicidal evaluation was carried out using the compounds at 1200 p.p.m. and spraying the plants to run off in a carrier volume of about 100 gallons/a.

The general procedure was to take potted plants in proper condition of growth for susceptibility to the fungal diseases to be evaluated, to spray these on a moving belt

TABLE IV.—ANALYTICAL DATA ON SALICYLALDEHYDE AZINES

| | | Analysis* (percent) | | | | |
|---|---|---|---|---|---|---|
| Example | Empirical formula | C | H | Halogen | N | O |
| 36 | $C_{10}H_{12}N_2O$ | 68.4 (68.1) | 6.8 (6.9) | | 15.9 (15.9) | 9.4 (9.1) |
| 37 | $C_{10}H_{11}BrN_2O$ | 47.0 (47.0) | 4.1 (4.4) | Br, 30.8 (31.4) | 10.9 (11.0) | 7.2 (6.3) |
| 38 | $C_{11}H_{14}N_2O_2$ | 64.5 (64.0) | 7.1 (6.8) | | 13.4 (13.6) | 16.0 (15.6) |
| 39 | $C_{10}H_{11}N_3O_3$ | 54.2 (54.4) | 5.2 (5.0) | | 19.1 (19.0) | 21.7 (21.6) |
| 40 | $C_{10}H_{11}N_3O_3$ | 54.1 | 4.8 | | 18.9 | 21.7 |
| 41 | $C_{11}H_{12}Br_2N_2O$ | 37.7 (38.8) | 3.3 (3.4) | Br, 46.5 (46.0) | 7.8 (8.0) | 9.4 (9.1) |
| 42 | $C_{21}H_{16}BrN_2O_2$ | 51.1 (51.7) | 3.0 (3.3) | Br, 31.4 (32.6) | 5.6 (5.7) | 7.1 (6.6) |
| 43 | $C_{10}H_{10}Br_2N_2O$ | 35.9 (36.0) | 3.1 (3.0) | Br, 47.4 (47.9) | 8.2 (8.3) | 5.4 (4.8) |
| 44 | $C_{10}H_{10}Cl_2N_2O$ | 48.7 (49.0) | 4.0 (4.1) | Cl, 29.0 (29.0) | 11.4 (11.4) | 6.9 (6.5) |
| 45 | $C_{10}H_{10}BrN_3O_3$ | 40.1 (40.0) | 3.5 (3.3) | Br, 26.6 (26.7) | 13.9 (14.0) | 16.1 (16.0) |
| 46 | $C_{10}H_{10}BrN_3O_3$ | 40.1 | 3.0 | Br, 25.2 | 13.8 | 16.2 |
| 47 | $C_{12}H_{12}Br_2N_2O_2$ | 36.6 (38.3) | 2.9 (3.2) | Br, 42.2 (42.5) | 7.5 (7.5) | 9.6 (8.5) |
| 48 | $C_{11}H_{12}Br_2N_2O_2$ | 36.2 (36.2) | 3.5 (3.3) | Br, 44.1 (44.0) | 7.7 (7.7) | 8.9 (8.8) |
| 49 | $C_{13}H_{14}Br_2N_2O$ | 41.3 (41.7) | 3.7 (3.7) | Br, 43.6 (42.8) | 7.4 (7.5) | 4.4 (4.3) |

*Values are given as found (calculated).

and allow to dry. The proper plants were then inoculated with the fungal spores and then allowed to incubate until the disease had developed and the control read or estimated. The percent disease control was reported by the following rating system:

A=90–100% control
B=80–90% control
C=70–80% control
D=50–70% control
E=Inactive, <50% control The phytopathogenic fungi and plants used in this investigation are given in Table V.

TABLE V.—PLANT DISEASES EVALUATED

| Fungus disease (spores/ml.) | Plant (age) | Incubation period (temperature (° F.)) |
|---|---|---|
| 1 Botrytis cinerea, botrytis blight (150,000). | Vicia faba, faba bean (10 days). | 3 days (80–82). |
| 2 Cercospora apii, cercospora blight (25,000). | Apium graveolens, celery. | 1 day (80)—14–18 days (ambient). |
| 3 Erysiphe polygoni, bean powdery mildew (10–25,000). | Phaseolus vulgaris, dwarf bean. | 10 days (ambient). |
| 4 Helminthosporium teres, barley heminthosporium (10–15,000). | Hordeum vulgare, barley (1 week). | 1 day (80)*—3–4 days (75). |
| 5 Phytophthora infestans, tomato late blight. | Lycopersicum esculentum, tomato (3 weeks). | 1.5 days (55)—1–2 days (70). |
| 6 Piricularia oryzae, rice blast (10–25,000). | Oryza sativa, rice (2 weeks). | 1 day (80–82)*—5–8 days (80–82). |
| 7 Pseudoperonospora cubensis, cucumber downy milkew. | Cucumis sativa, cucumber (2 weeks). | 1 day (70)*—6 days (ambient). |

*High humidity.

The values found are given in Table VI.

TABLE VI

Disease Control Index at 1,200 p.p.m.

| Example | B. cinerea | C. apii | E. polygoni | H. teres | P. infestans | P. oryzae | P. cubensis |
|---|---|---|---|---|---|---|---|
| 1 | | A | | E | P | E | E |
| 2 | | A | | E | P | E | E |
| 3 | E | E | | E | E | A | P |
| 4 | E | E | | A | E | E | E |
| 5 | | B | | E | A | E | E |
| 6 | E | A | | P | E | E | E |
| 7 | E | A | | E | E | E | E |
| 8 | | | | B | E | E | |
| 9 | | | | E | A | E | E |
| 10 | E | A | | B | P* | E | A |
| 11 | | A | | E | P | E | E |
| 12 | E | E | | B | E | E | E |
| 13 | E | A | | E | P | A | E |
| 14 | E | B | | E | P | E | E |
| 15 | E | B | | E | B | B | E |
| 16 | E | B | | E | E | A | E |
| 17 | E | A | | E | P | B | E |
| 18 | C | B | | E | A | D | B |
| 19 | A | A | | E | A | B | P |
| 20 | E | A | | P | B | E | P |
| 21 | D | A | | E | P | A | A |
| 22 | | A | | E | A | E | E |
| 23 | E | B | | E | P* | A | E |
| 24 | E | B | | E | P | B | E |
| 25 | E | B | | E | D | A | P |
| 26 | | B | | E | A | E | E |
| 27 | E | A | | E* | B | E | E |
| 28 | E | A | | P | P | E | E |
| 29 | (*) | A | | E | B | E | E |
| 30 | (*) | B | | A | E | E | E |
| 31 | | A | | E | B | E | A |
| 32 | E | D | | E | E | E | E |
| 33 | E | B | | E | B | A | E |
| 34 | E | A | | E | E | A | B |
| 35 | E | B | | E | P | E | E |
| 36 | E | B | | E | E | E | E |
| 37 | | B | | E | E | E | E |
| 38 | | A | | B | E | E | E |
| 39 | | A | | E | A | E | E |
| 40 | | B | | E | A | E | E |
| 41 | E | B | | E | P | B | P |
| 42 | | | | E | P | E | A |
| 43 | E | A | | E | P | E | E |
| 44 | E | A | | E | P | A | E |
| 45 | | E | | A | B | B | E |
| 46 | | E | | B | E | E | A |
| 47 | | B | | E | A | B | E |
| 48 | | A | | B | B | E | E |
| 49 | E | P | | E | P | A | B |

*300 p.p.m.

It will be noted that these compounds are particularly promising for the control of cercospora blight. The compounds of Examples 6 and 43 were evaluated in the field on Cercospora beticola on sugar beets and gave a measure of control.

A weathering type test was run on the compound of Example 6 as typical of the compounds of this invention in comparison with a commercial standard known as mancozeb (a zinc coordination product of manganese ethylenebisdithiocarbamate.) In this test after application of the chemical to the celery plants, the dried deposit was subjected to an application of about 2" of rain from a standard fogging machine, after which the plants were inoculated with Cercospora apii in the regular manner. The following Table VII gives the results.

TABLE VII.—CEROSPORA CONTROL AFTER WEATHERING

| Treatment | Mean percent control | | |
|---|---|---|---|
| | 600 p.p.m. | 150 p.p.m. | 75 p.p.m. |
| Example 6 | 100 | 88 | 30–50 |
| Mancozeb | 78 | 70 | 20–50 |

Thus, the compounds of this invention are an improvement over the commercial standard in being more persistent to weathering.

The hydrazones and azines of this invention are useful as agricultural fungicides and as such may be applied to various loci such as the seed, the soil or the foliage. For such purposes these compounds may be used in the technical or pure form as prepared, as solutions or as formulations. The compounds are usually taken up in a carrier or are formulated so as to render them suitable for subsequent dissemination as pesticides. For example, these hydrazones and azines may be formulated as wettable powders, emulsifiable concentrates, dusts, granular formulations, aerosols, or flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc., publication "Detergents and Emulsifiers 1970 Annual."

In general, the compounds of this invention are somewhat limited in solubility but they may be dissolved in certain solvents such as dimethylformamide, pyridine or dimethyl sulfoxide and such solutions extended with water. The concentration of the solution may vary from 2% to 50% with a preferred range being 5 to 25%.

For the preparation of emulsifiable concentrates, the compound may be dissolved in suitable organic solvents, or a mixture of solvents, together with an emulsifying agent which permits dispersion of the pesticide in water. The concentration of the active ingredient in emulsifiable concentrates is usually 10% to 25% and in flowable emulsion concentrates, this may be as high as 75%.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%. A typical wettable powder was made by blending 50 parts of 3,5-dichlorosalicylaldehyde hydrazone, 45 parts of a synthetic precipitated hydrated silicon dioxide sold under the trademark Hi-Sil®, and 5 parts of sodium lignosulfonate (Marasperse® N–22). In another preparation a kaolin type (Barden) clay was used in place of the Hi-Sil in the above wettable powder, and in another such preparation 25% of the Hi-Sil was replaced with a synthetic sodium silico aluminate sold under the trademark Zeolex® 7.

Dusts are prepared by mixing the hydrazone or azine with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredients are commonly made and are subsequently diluted to 1% to 10% use concentration.

The hydrazones or azines can be applied as fungicidal sprays by methods commonly employed, such as conventional high-gallonage hydraulic sprays, low gallonage sprays, air-blast spray, aerial sprays and dusts. The dilution and rate of application will depend upon the type of equipment employed, the method of application and diseases to be controlled, but the effective amount is usually 0.1 lb. to 25 lbs. per acre of the active ingredient.

As a seed protectant, the amount of toxicant coated on the seed is usually at a dosage rate of about 0.1 to 20 ounces per hundred pounds of seed. As a soil fungicide the chemical may be incorporated in the soil or applied to the surface usually at a rate of 0.1 to 25 lbs. per acre. As a foliar fungicide, the toxicant is usually applied to growing plants at a rate of 0.25 to 10 pounds per acre.

Fungicides which may be combined with the fungicides of this invention include:

(a) dithiocarbamates and derivatives such as: ferric dimethyldithiocarbamate (ferbam), zinc dimethyldithiocarbamate (ziram), manganese ethylenebisdithiocarbamate (maneb) and its coordination product with zinc ion (mancozeb), zinc ethylenebisdithiocarbamate (zineb,) sodium methyldithiocarbamate (metham), tetramethylthiuramdisulfide (thiram), and 3,5-dimethyl-1,3,5-2H-tetrahydrothiadiazine-2-thione (dazomet);

(b) nitrophenol derivatives such as: dinitro-(1-methylheptyl)phenyl crotonate (dinocap), 2-sec-butyl-4,6-dinitrophenyl 3,3-dimethyl acrylate (binapacryl), and 2-sec-butyl-4,6-dinitrophenyl isopropyl carbonate;

(c) heterocyclic structures such as: N-trichloromethylthiotetrahydro-phthalimide (captan), N-trichloromethylthiophthalimide (folpet), 2-heptadecyl-2-imidazoline acetate (glyodin), 2-octylisothiazolone-3, 2,4-dichloro-6-(o-chloroanilino)-s-triazine, diethyl phthalimidophosphorothioate, 4-butyl-1,2,4-triazole, 5-amino-1-[bis(dimethylamino)phosphinyl]-3-phenyl - 1,2,4 - triazole, 5-ethoxy-3-trichloromethyl-1,2,4-thiadiazole, 2,3-dicyano-1,4-dithiaanthraquinone (dithianon), 2-thio-1,3-dithio-[4,5-b]quinoxaline (thioquinox), methyl 1-(butylcarbamoyl)-2-benzimidazole carbamate (benomyl), 2-(4-thiazolyl)benzimidazole, 4-(2-chlorophenylhydrazono)-3-methyl-5-isoxazolone, pyridine-2-thiol-1-oxide, 8-hydroxyquinoline sulfate, 2,3-dihydro-5-carboxanilido-6-methyl-1,4-oxathiin-4,4-dioxide, 2,3 - dihydro-5-carboxanilido-6-methyl-1,4-oxathiin, α-(phenyl)-α-(2,4-dichlorophenyl) - 5 - pyrimidinylmethanol (triarimol), cis-N-[(1,1,2,2 - tetrachloroethyl)thio]-4-cyclohexene-1,2-dicarboximide, 3-[2-(3,5-dimethyl-2-oxycyclohexyl)-2-hydroxy]glutarimide (cycloheximide), and dehydroacetic acid;

(d) miscellaneous halogenated fungicides such as: tetrachloro-p-benzoquinone (chloranil), 2,3 - dichloro - 1,4-naphthoquinone (dichlone), 1,4-dichloro - 2,5 - dimethoxybenzene(chloroneb), 3,5,6-trichloro-o-anisic acid (tricamba), 2,4,5,6 - tetrachloroisophthalonitrile, 2,6-dichloro-4-nitroaniline (DCNA), 2 - chloro-1-nitropropane, polychloronitrobenzenes such as: pentachloronitrobenzene (PCNB) and tetrafluorodichloroacetone;

(e) fungicidal antibiotics such as: griseofuloin, kasugamycin and streptomycin;

(f) copper-based fungicides such as: cuprous oxide, basic cupric chloride, basic copper carbonate, copper naphthenate, and Bordeaux mixture; and (g) miscellaneous fungicides such as: diphenyl, dodecylguanidine acetate (dodine), phenylmercuric acetate, N-ethylmercuri-1,2,3,6-tetrahydro-3,6-endomethano - 3,4,5,6,7,7-hexachlorophthalimide, phenylmercuric monoethanolammonium lactate, p - dimethylaminobenzenediazo sodium sulfonate, methyl isothiocyanate, 1-phenylthiosemicarbazide, nickel-containing compounds calcium cyanamide, lime sulfur, and sulfur.

We claim:
1. A compound of the formula

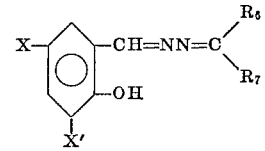

wherein $R_6$ and $R_7$ are individually selected from the group consisting of hydrogen and an alkyl radical of 1 to 4 carbon atoms, and X is:
   (a) selected from the group consisting of hydroxy, halo, methoxy and nitro and X' is selected from the group consisting of hydrogen, nitro and halo, or
   (b) hydrogen and X' is selected from the group consisting of methoxy and nitro.

2. 3,5 - Dibromosalicylaldehyde isopropylidenehydrazone.

References Cited
UNITED STATES PATENTS 2,889,333   6/1959   Coker et al. _____ 260—566 B X
3,382,281   5/1968   Jankowski et al. ____ 260—566 B
3,407,174   10/1968  Kuriyama et al. __ 260—566 B X LEON ZITVER, Primary Examiner G. A. SCHWARTZ, Assistant Examiner U.S. Cl. X.R.

260—247.5, 465 D, 465 E, 551 P, 556 H, 558 H, 559 R, 561 H; 424—220, 248, 304, 320, 321, 324